United States Patent
Hammond et al.

(10) Patent No.: US 11,423,485 B2
(45) Date of Patent: **\*Aug. 23, 2022**

(54) ADVISORY THRESHOLDS AND ALERTS FOR MANAGING POSITION CONCENTRATION RISK

(71) Applicant: Intercontinental Exchange Holdings, Inc., Atlanta, GA (US)

(72) Inventors: Thomas Hammond, Tinley Park, IL (US); Thomas Farley, New York, NY (US); Raymond J. Cummings, Decatur, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,155

(22) Filed: Feb. 8, 2022

(65) Prior Publication Data

US 2022/0164887 A1    May 26, 2022

Related U.S. Application Data

(63) Continuation of application No. 17/385,242, filed on Jul. 26, 2021, now Pat. No. 11,276,119, which is a
(Continued)

(51) Int. Cl.
*G06Q 40/06* (2012.01)

(52) U.S. Cl.
CPC .................... *G06Q 40/06* (2013.01)

(58) Field of Classification Search
None
See application file for complete search history.

(56) References Cited

U.S. PATENT DOCUMENTS

| | | |
|---|---|---|
| 5,649,116 A | 7/1997 | McCoy et al. |
| 7,577,601 B1 | 8/2009 | Rademacher et al. |

(Continued)

FOREIGN PATENT DOCUMENTS

| | | |
|---|---|---|
| CA | 2455017 | 2/2003 |
| WO | 2005/003894 A2 | 1/2005 |
| WO | 2007/024579 A2 | 3/2007 |

OTHER PUBLICATIONS

Townsend analytics deploys hottrend smart alerts(TM) using microsoft's new SQL 2000 server-based notification services. (Nov. 25, 2002). PR Newswire Retrieved from https://dialog.proquest.com/professional/docview/448903549?accountid=131444 on Apr. 8, 2022 (Year: 2002).*

(Continued)

*Primary Examiner* — Kito R Robinson
(74) *Attorney, Agent, or Firm* — DLA Piper LLP (US)

(57) ABSTRACT

Management of a position concentration risk of an account includes the establishment of a threshold level for an aggregate trader position. The aggregate trader position may be associated with one or more customer accounts that are managed by one or more clearing firms. An actual parameter value associated with each of the customer accounts is aggregated to determine an aggregate parameter value, which is compared against the established threshold value. If, based on the comparison between the aggregate parameter value and the established threshold value, it is determined that the aggregate parameter value meets or exceeds the established threshold value, an advisory alert is generated, which may be automatic. The advisory alert is then communicated or otherwise provided to one or more authorized entities.

30 Claims, 4 Drawing Sheets

Related U.S. Application Data continuation of application No. 17/232,496, filed on Apr. 16, 2021, now Pat. No. 11,113,763, which is a continuation of application No. 17/076,216, filed on Oct. 21, 2020, now Pat. No. 11,010,836, which is a continuation of application No. 12/430,483, filed on Apr. 27, 2009, now Pat. No. 10,915,958.

(60) Provisional application No. 61/048,989, filed on Apr. 30, 2008.

(56) References Cited

U.S. PATENT DOCUMENTS

| | | | |
|---|---|---|---|
| 7,870,062 B2 | 1/2011 | Waelbroeck et al. | |
| 7,882,014 B2 | 2/2011 | Shapiro et al. | |
| 8,073,763 B1 | 12/2011 | Merrin et al. | |
| 8,433,641 B2 | 4/2013 | Angle et al. | |
| 8,738,507 B2 | 5/2014 | Barker et al. | |
| 9,911,157 B2 | 3/2018 | Johnston et al. | |
| 2002/0082967 A1 | 6/2002 | Kaminsky et al. | |
| 2003/0033240 A1 | 2/2003 | Balson et al. | |
| 2003/0115123 A1 | 6/2003 | Lang | |
| 2003/0144940 A1 | 7/2003 | Kochansky et al. | |
| 2004/0267655 A1 | 12/2004 | Davidowitz et al. | |
| 2005/0154662 A1* | 7/2005 | Langenwalter | G06Q 40/00 705/37 |
| 2005/0203825 A1 | 9/2005 | Angle et al. | |
| 2006/0059065 A1 | 3/2006 | Glinberg et al. | |
| 2007/0156568 A1* | 7/2007 | Jovanovic | G06Q 40/06 705/37 |
| 2007/0233594 A1 | 10/2007 | Nafeh | |
| 2007/0276748 A1 | 11/2007 | Shapiro et al. | |
| 2008/0281741 A1* | 11/2008 | Hyde | G06Q 40/00 705/35 |
| 2009/0150279 A1 | 6/2009 | Hadar | |
| 2009/0177591 A1 | 7/2009 | Thorpe et al. | |
| 2009/0210338 A1 | 8/2009 | Hor et al. | |
| 2010/0312718 A1 | 12/2010 | Rosenthal et al. | |
| 2012/0123967 A1 | 5/2012 | Glinberg et al. | |
| 2012/0130923 A1 | 5/2012 | Shah | |
| 2012/0209790 A1 | 8/2012 | Szydio | |

OTHER PUBLICATIONS

Canadian Office Action dated Dec. 1, 2014 for Canadian Application No. 2,663,489.

National Commodities and Derivatives Exchange, Ltd., "Risk Management at NCDEX," Published Jul. 17, 2004.

Dubai Gold and Commodities Exchange (DGCX), "Risk Management System," http://www.dgcx.ae/content/Home.en.Market_Operations.Risk_Management.aspx, (2007).

King, Paul M., "Exits are where the money is: exits are a critical part of a profitable trading system. But, many traders overlook exits in favor of finding profitable entries. We look at how exits affect system performance even when entry criteria is kept constant," ProQuest, Sep. 8, 2020, Futures, 2007.

Toonkel, B. J., "Account Aggregation Coming to Morgan Stanley," American Banker, 165 (174), 15, (Year: 2000). Retrieved from https://dialog.proquest.com/professional/docview/672341275?accountid=131444 on Mar. 18, 2021.

"NYSE Eyes Tripling Thresholds for Halting Trading: [FINAL Edition],"Nov. 27, 1997, Pantagraph Retrieved from https://dialog.proquest.com/professional/docview/252320877?accountid=131444 on Jun. 16, 2021.

Schmerken, I., "Wireless Wealth Management Tools Emerge for Advisors and Consumers," Wall Street & Technology, 19(9), 49, retrieved from https://dialog.proquest.com/professional/docview/676564131?accountid=131444 on Nov. 5, 2021.

* cited by examiner

ADVISORY THRESHOLDS AND ALERTS FOR MANAGING POSITION CONCENTRATION RISK

FIELD OF THE INVENTION

The disclosure is generally related to managing position concentration risk and to establishing thresholds and generating alerts related to levels of position concentration risk.

BACKGROUND

Clearing firms supervise the risk of accounts of which they manage, administer, and otherwise oversee, but the clearing firms may be unaware of the overall concentration risk of the total account position for one or more of their account customers. Position concentration risk of an account that clears multiple clearing firms may pose problems and uncertainties for one or more of the clearing firms individually because each clearing firm lacks information related to the aggregate risk of the account across the multiple clearing firms. An advisory alert or indication to advise of or provide an update related to the overall concentration risk of each total account position is thus desired by clearing firms and/or other entities. A further desirable aspect includes providing clearing firms, account customers, and/or other authorized entities with the ability and flexibility to request information and updates related to the overall concentration risk of each total account position based upon established parameters.

SUMMARY

A method of managing a position concentration risk of an account includes the establishment of a threshold level for an aggregate trader position. The aggregate trader position may be associated with one or more customer accounts that are managed by one or more clearing firms. An actual parameter value associated with each of the customer accounts is aggregated to determine an aggregate parameter value, which is compared against the established threshold value. If, based on the comparison between the aggregate parameter value and the established threshold value, it is determined that the aggregate parameter value meets or exceeds the established threshold value, an advisory alert is automatically generated. The advisory alert is then communicated or otherwise provided to one or more authorized entities.

A system of managing a position concentration risk of an account includes a server, on which a position concentration risk software application is stored. One or more user third party terminals are coupled to the server for access thereto. Various modules comprise the position concentration risk software application and include computer-readable instructions for performing the operations. The instructions are stored by a memory component and executed by a processor.

In another aspect, a method of managing a position concentration risk of an account includes establishing a threshold level for a trader position, where the trader position is associated with a customer account and includes one or more contracts for the purchase or sale of a commodity. The method further includes comparing an actual parameter value associated with the trader position against the threshold level and automatically generating an advisory alert if it is determined that the actual parameter value meets or exceeds the threshold level. The advisory alert is communicated to an authorized entity.

In yet another aspect, a method of managing a position concentration risk of an account includes establishing a threshold level for a trader position that is associated with a customer account. The trader position includes one or more contracts for the purchase or sale of a commodity. An actual parameter value associated with the trader position is determined and an actual parameter value associated with the trader position is compared against the threshold level. The method includes determining, based on the comparing step, whether to impose one or more intervening measures to regulate transactions that impact the trader position's actual parameter value.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

A clearing firm may manage, administer, and otherwise oversee the accounts of its traders, e.g., account customers of the clearing firm, and may also track traders with reportable positions. A reportable position may be defined as the number or overall value of contracts held by a trader. A large-trader may be defined as a trader that has positions that exceed a threshold of a reportable limit. Hence, traders with large positions are known as large-traders.

A large-trader account may be defined as an account that incorporates each of the multiple clearing accounts used by a large-trader for trading, such as accounts for various exchanges, products, asset classes, and the like. Rather than reporting each individual account of a large-trader, a large-trader account collectively tracks and manages all positions of the large-trader.

A large position alert system and method may manage a position concentration risk of an account and may be utilized to establish thresholds, such as open interest thresholds, by contract for a large-trader account. Upon the establishment of the thresholds, large-trader data may be utilized to determine if the open interest threshold has been exceeded. If the threshold is exceeded, a message, i.e. an advisory alert, may be generated to inform the clearing firm customer and/or any other authorized entity.

Figure 1:
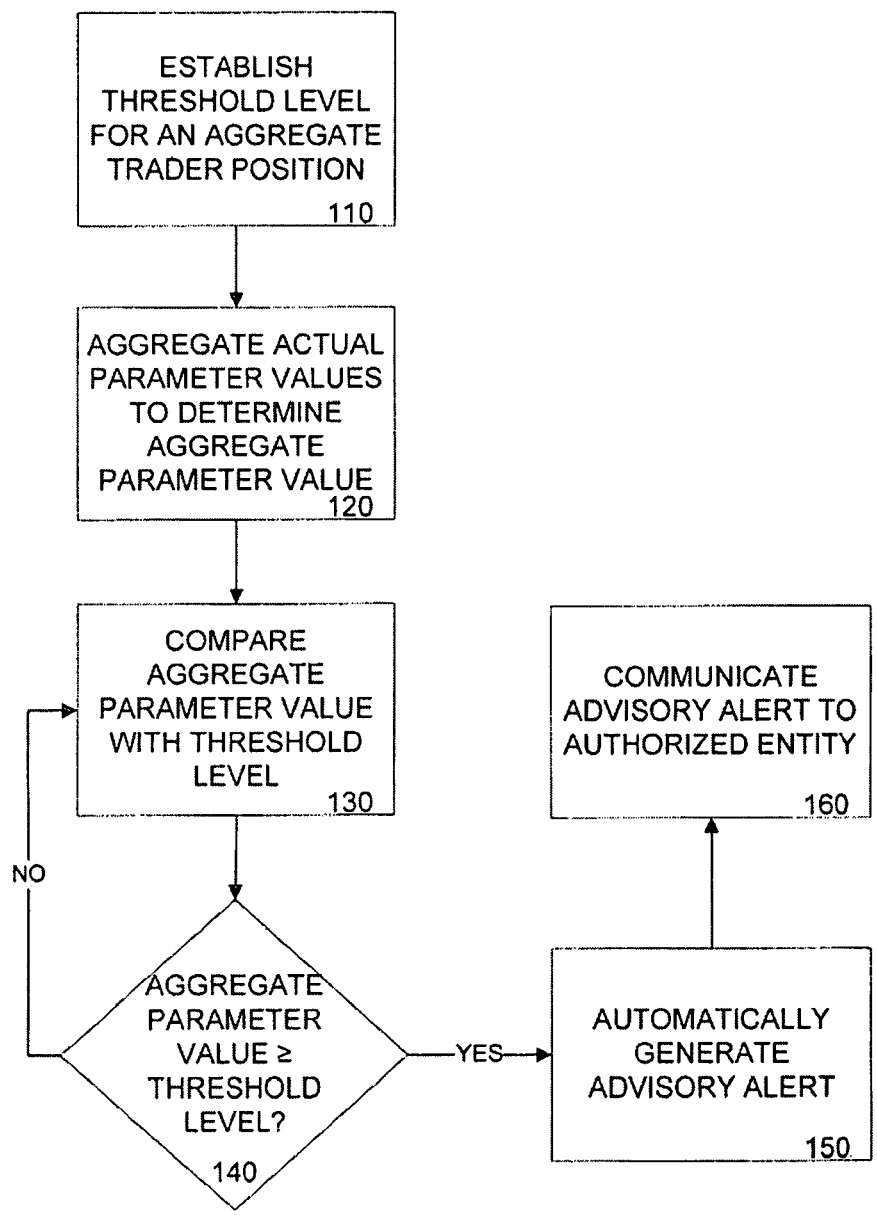
FIG. 1 is a flowchart illustrating a method of managing a position concentration risk of an account according to an exemplary embodiment.

With reference to FIG. 1, a method 100 of managing a position concentration risk of an account, according to an exemplary embodiment, is illustrated.

At 110, a threshold level for an aggregate trader position is established. The aggregate trader position may be associated with one or more customer accounts that may be managed by one or more clearing firms.

In an embodiment, the aggregate trader position may comprise two or more contracts having correlated risk profiles, in which case the contracts having the correlated risk profiles may be associated with the aggregate trader position. In another embodiment, the aggregate trader position may comprise two or more contracts having opposed risk profiles, in which case the contracts having the opposed risk profiles may be associated with the aggregate trader position. In yet another embodiment, the aggregate trader position may include a combination of long and short contracts associated with a particular commodity. The trader position and contracts are not limited to financial instruments, such as futures, options on futures, and the like, but rather may also include cleared, physically delivered commodities, such as over-the-counter (OTC) and various asset class positions, for example.

At 110, each of the one or more clearing firms may establish one or more threshold levels particular to it. For example, the aggregate trader position may be associated with a first account managed by a first clearing firm and a second account managed by a second clearing firm. In this situation, the first clearing firm may desire, and accordingly establish, a particular threshold level relative to the aggregate trader position, while the second clearing firm desires and accordingly establishes a different threshold level.

The method 100 is not limited to clearing firms as the only entity capable of establishing a threshold level for an aggregate trader position. According to an embodiment, an owner of the aggregate trader position may establish the threshold level for the position as, for example, a range of a predetermined level. Other entities and individuals may also establish the threshold level. Moreover, the establishing, as well as modifying or canceling, of the threshold level may be implemented remotely via an Internet accessible interface. Upon any modifications or canceling of the threshold level, a notification may be sent to any authorized entities, such as the one or more clearing firms or the owner of the aggregate trader position.

Each threshold level may be a percentage of a predetermined value, a percentage of a particular clearing firm's obligations, a combination thereof or any other desirable parameter. For example, the threshold level may be a percentage of a speculative position limit, a percentage of a hedge position limit, or an accountability level. Additionally, the threshold level may be valid for one processing cycle, after which a new threshold level is established.

The threshold level may be established at a value that renders the aggregate trader position reportable to regulatory authorities if exceeded. In an embodiment, the advisory alert may be generated prior to rendering the aggregate trader position reportable.

In an embodiment, when a threshold level is established, an indication is communicated to an owner of the aggregate trader position to inform the owner of the threshold level. The owner may either accept or reject the established threshold level and may communication either the acceptance or rejection, which may be further communicated to an authorized entity. The threshold level may be activated if accepted by the owner of the aggregate trader position. For example, if a clearing firm establishes a threshold level, an indication of such is communicated to the owner. In turn, the owner's acceptance or rejection is communicated to the clearing firm that established the threshold level, as well as to any other entities as authorized by, for example, the clearing firm or the owner.

According to an additional embodiment, an owner of the aggregate trader position and/or one or more clearing firms may be notified if the owner no longer has a trader position at a particular clearing firm. For example, if a clearing firm, at 110 of the method 100, establishes a threshold level for an aggregate trader position, that particular clearing firm, as well as the owner of the aggregate trader position, may be notified if the owner is no longer utilizing that particular clearing firm. In such a situation, the particular clearing firm may not be eligible to set a threshold level for that aggregate trader position. Accordingly, the particular clearing firm may be excluded from receiving communications related to the aggregate trader position.

Returning to the flowchart of FIG. 1, at 120, actual parameter values that are associated with each of the customer accounts of the aggregate trader position are compiled and aggregated to determine an aggregate parameter value. The aggregate parameter value may include, for example, a total number of contracts of the aggregate trader position, a net value of the contracts, a risk value associated with the contracts, a combination thereof and/or any other desirable parameter.

At 130, the aggregate parameter value associated with the aggregate trader position, as determined at 120, is compared to the threshold level established at 110. The comparing step 130 may occur periodically, continually, on-demand, following a predefined event, randomly, at least once daily, or a combination thereof. In an embodiment, the comparing step 130 occurs once daily after processing all contracts associated with the aggregate trade position.

At 140, a determination is made as to whether the aggregate parameter value exceeds or meets the threshold level based on the comparing step at 130. If the aggregate parameter value neither meets nor exceeds the threshold level, the comparison and determination operations may continue to be performed, at 130 and 140, continuously, for a predetermined number of times, or after a predetermined period of time has elapsed.

At 150, if, based on the comparing step at 140, it is determined that the aggregate parameter value either meets or exceeds the threshold level, an advisory alert is automatically generated. The advisory alert may include, for example, predetermined account details relating to the one or more customer accounts of the aggregate trader position. In an embodiment, the advisory alert may be anonymous insofar as it does not reveal the identify of a clearing firm or other authorized entity associated with the aggregate trader position.

At 160, the generated advisory alert is communicated to an authorized entity. The authorized entity be one or more of the clearing firms, a regulatory entity, a third party, an owner of the aggregate trader position, or a combination thereof. The advisory alert may be in the form of an email message, a text message, an instant message, or another form of communication.

According to an embodiment, the aggregate trader position may be a large-trader position that includes a plurality of contracts across a plurality of customer accounts. The customer accounts may be managed by a plurality of clearing firms. In this embodiment, each of the customer accounts and related positions may be associated with a single large-trader account. The communication of the advisory alert is accordingly communicated in connection with the large-trader account. Moreover, each of the clearing firms may be authorized to anonymously communicate or otherwise obtain notices and/or information relating to the large-trader position to and from one another. This authorization may be in the form of a contractual agreement, for example, entered into by one or more clearing firms and an owner of the large-trader position.

According to another exemplary embodiment of managing a position concentration risk of an account, two or more threshold levels associated with the aggregate trader position may be established. For example, one clearing firm may desire alerts of the aggregate trader position related to two or more thresholds. Upon the establishment of the multiple threshold levels, the aggregate parameter value is compared to each of the multiple threshold levels.

Another aspect allows for a determination of whether to impose one or more intervening measures to regulate transactions that impact the actual parameter value associated with each of the customer accounts of the aggregate trader position. For example, if it is determined that the aggregate parameter value meets, exceeds, or is within a predetermined range of at least one of the threshold levels, then one or more intervening measures may be imposed. Examples of intervening measures may include disabling or limiting certain trade registration access associated with the trader position, disabling or limiting access to a trading system, disabling or limiting access to a clearing system, freezing one or more customer accounts, and the like.

In addition to or instead of an advisory alert, an approaching alert function may also be implemented based on the result of the comparing step 130. If it is determined, based on the comparing step 130, that the aggregate parameter value is within a predetermined range of the threshold level, an approaching alert may be generated and communicated to one or more authorized entities. This may serve as a useful indication that the aggregate parameter value is close to the threshold level. The entity that establishes the threshold level may also establish the predetermined range for generating and receiving an approaching alert.

Figure 2:
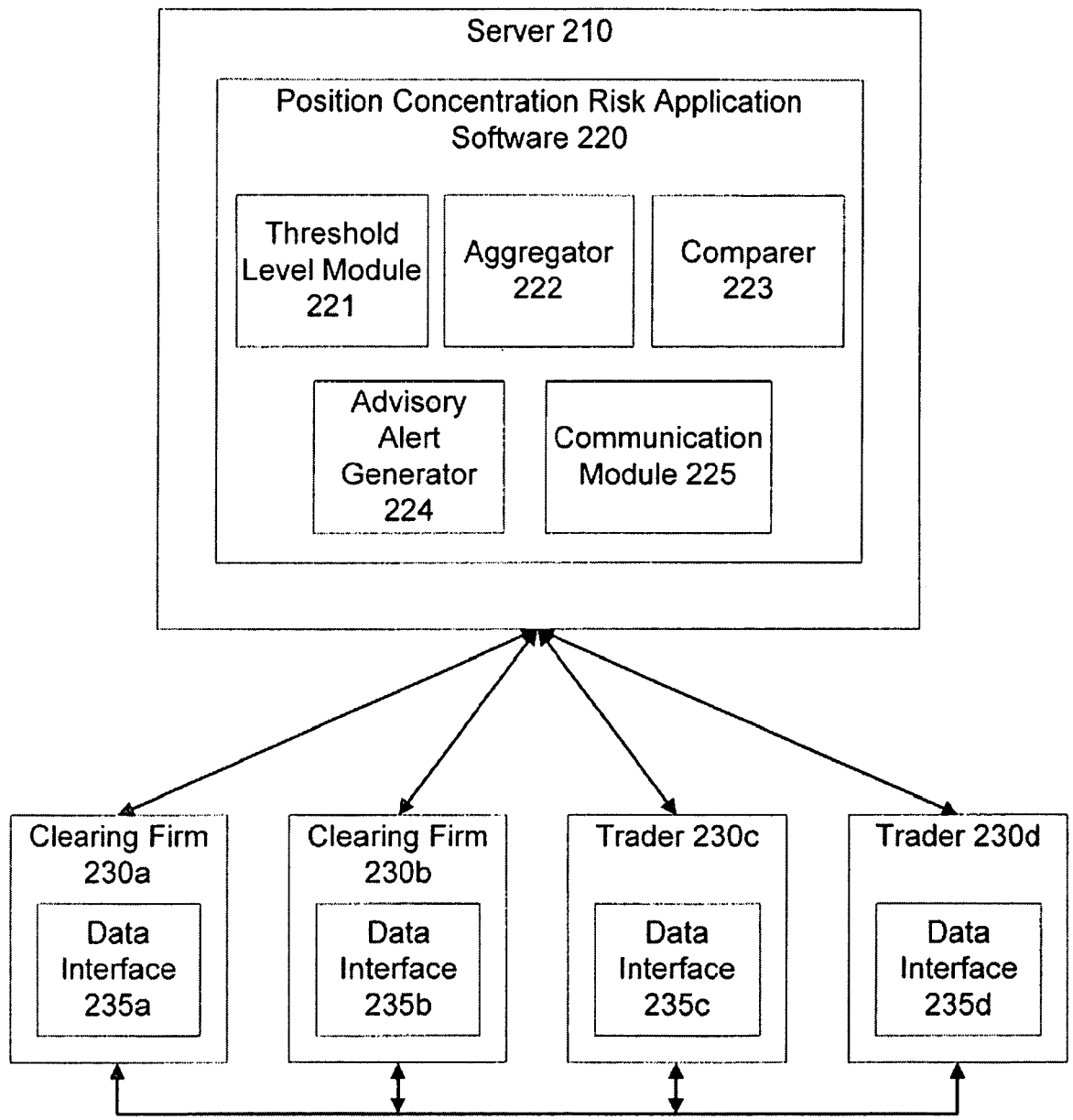
FIG. 2 is a block diagram illustrating a system for managing a position concentration risk of an account according to an exemplary embodiment.

An exemplary system 200 for managing a position concentration risk of an account may include components for performing some or all portions of the above-described method 100. With reference to FIG. 2, the components may include, for example, a server 210 on which a position concentration risk software application 220 is stored. The system 200 may further include one or more user third party terminals 230 that are coupled to the server 210. The terminals 230 may be coupled to the server 210 through a wired or wireless network, such as, for example, the Internet.

Each third party terminal 230 may include, according to an embodiment, a data interface 235 for accessing the server 210 and the software application 220 stored on the server 210. Shown in FIG. 2 are four third party terminals 230, including two clearing firms 230a and 230b and two traders 230c and 230d, respectively including a data interface 235a, 235b, 235c, and 235d. However, the system 200 is not limited to this arrangement, and more or fewer servers 210 and/or third party terminals 230 may be incorporated within the system 200. Moreover, the third party terminals 230 are not limited to clearing firms and traders, but may also include other users and entities. The third party terminals 230 may communicate with one another directly via a network, for example, or through the server 210.

The software application 220 may provide users with the functionality to manage a position concentration risk that is associated with one or more customer accounts. The software application 220 may include, but is not limited to, a threshold level module 221, an aggregator 222, a comparer 223, an advisory alert generator 224, and/or a communication module 225.

When the software application 220 is executed and accessed via the one or more third party terminals 230, the threshold level module 221 enables users of the third party terminals 230 to establish one or more threshold levels for an aggregate trader position. The aggregate trader position may be associated with the one or more customer accounts that are managed by one or more clearing firms, such as the clearing firms 230a and 230b.

The aggregator 222 operates to aggregate an actual parameter value associated with each of the customer accounts to determine an aggregate parameter value. The comparer 223 may operate to compare the aggregate parameter value with the threshold level.

If, based on the comparing step by the comparer 223, it is determined that the aggregate parameter value meets or exceeds the threshold level, the advisory alert generator 224 may create an advisory alert.

The advisory alert may be communicated to an authorized entity by the communication module 225.

It is noted that the various components described herein with respect to the system 200 may include one or more computing devices, hand-held communication devices, mobile computers and/or any other electronic communication means. The components may be described in the general context of comprising computer-executable instructions, such as program modules, being executed by a computer. Generally, program modules may include routines, programs, objects, components, data structures, or the like that perform particular tasks or implement particular abstract data types.

Figure 3:
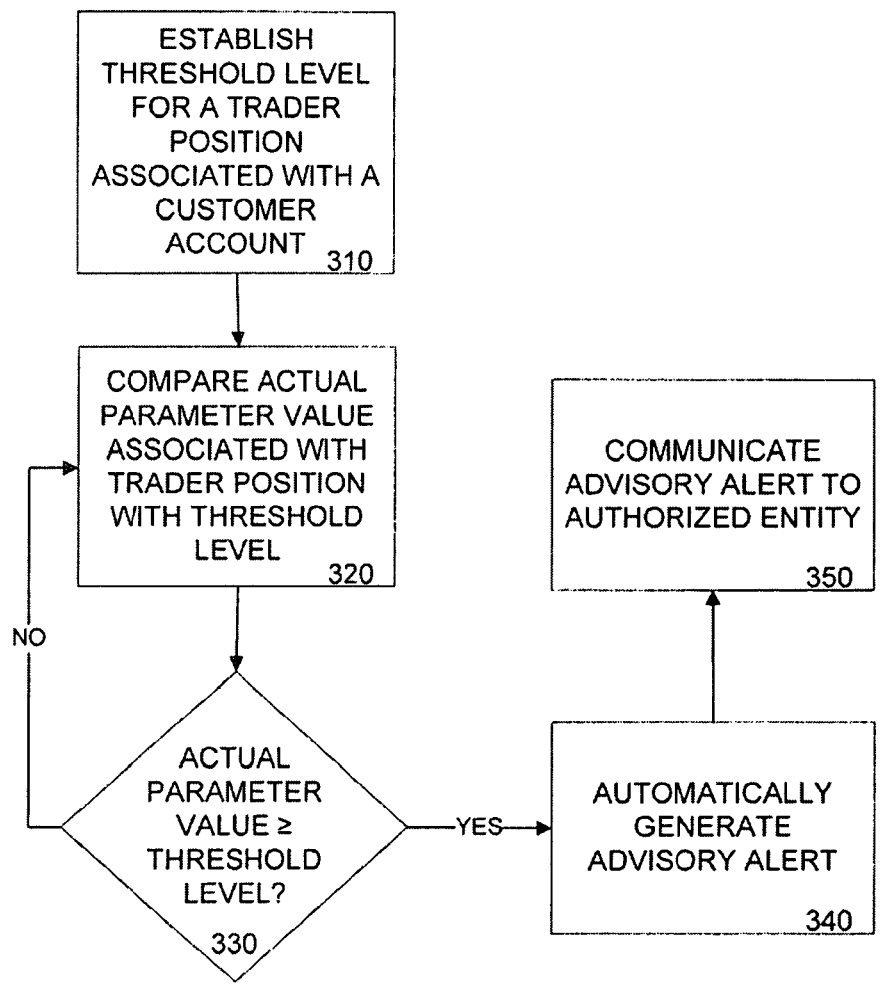
FIG. 3 is a flowchart illustrating a method of managing a position concentration risk of an account according to an additional exemplary embodiment.

With reference to FIG. 3, a method 300 of managing a position concentration risk of an account, according to an exemplary additional embodiment, is illustrated.

At 310, a threshold level for a trader position associated with a customer account is established. The trader position includes one or more contracts for the purchase or sale of a commodity.

According to an embodiment, the trader position may be a combination of long and short contracts associated with a particular commodity, for example. The contracts may have correlated risk profiles, in which case the contracts with the correlated risk profiles are associated with the trader position. The contracts may have opposed risk profiles, in which case the contracts having the opposed risk profiles are associated with the trader position.

The threshold level may be a percentage of a speculative position limit, or the threshold level may be a percentage of a hedge position limit. The threshold level may be established at a value that renders the trader position reportable to a regulatory authority if exceeded. The threshold level may be established at a value that triggers an advisory alert prior to rendering the trader position reportable.

At 320, an actual parameter value that is associated with the trader position is compared with the threshold level that is established at 310. The actual parameter value may include a total number of the contracts of the trader position, a net value of the contracts, a risk value associated with the contracts, a combination thereof and/or any other desirable parameter.

At 330, a determination is made based on the preceding comparison (320) as to whether the actual parameter value meets or exceeds the threshold level.

At 340, an advisory alert is automatically generated if, based on the preceding comparison and determination steps, it is determined that the actual parameter value meets or exceeds the threshold level. According to an embodiment, an advisory alert may be generated if, based on the preceding comparison, it is determined that the actual parameter value is within a predetermined range of the threshold level.

At 350, after the generation of the advisory alert, the advisory alert is communicated to one or more authorized entities. An authorized entity may be a clearing firm, a regulatory entity, a third party, and an owner of the trader position. The advisory alert may comprise predetermined account details relating to the customer account, for example. Other details and/or information may also be included in the advisory alert. Moreover, the advisory alert may be anonymous. The advisory alert may be communicated via electronic-mail means or other communication forms, such as a text or instant message.

The establishing of the threshold level, as well as later modifying or canceling the threshold level, may be performed remotely by a user of a third party terminal, for example, via an Internet accessible interface. Upon any modifications or canceling of the threshold level, a notification may be sent to any authorized entities, such as the one or more clearing firms or the owner of the trader position.

Figure 4:
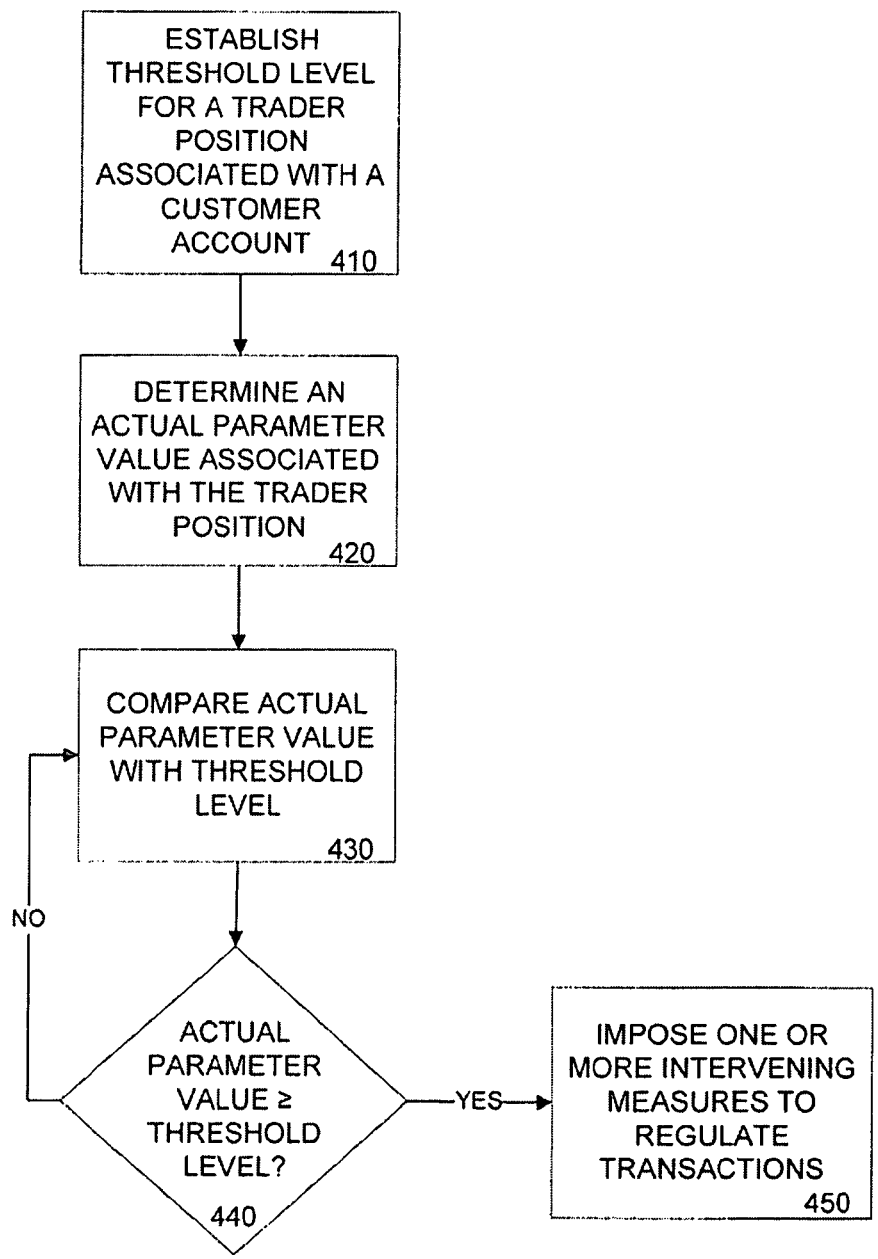
FIG. 4 is a flowchart illustrating a method of managing a position concentration risk of an account according to yet another exemplary embodiment.

With reference to FIG. 4, a method 400 of managing a position concentration risk of an account, according to yet another exemplary embodiment, is illustrated.

At 410, the method 400 includes establishing a threshold level for a trader position associated with a customer account, where the trader position comprises one or more contracts for the purchase or sale of a commodity.

According to an embodiment, the trader position may be a combination of long and short contracts associated with a particular commodity, for example. The contracts may have correlated risk profiles, in which case the contracts with the correlated risk profiles are associated with the trader position. The contracts may have opposed risk profiles, in which case the contracts having the opposed risk profiles are associated with the trader position.

The threshold level may be a percentage of a speculative position limit, or the threshold level may be a percentage of a hedge position limit. The threshold level may be established at a value that renders the trader position reportable if exceeded. The threshold level may be established at a value that triggers an advisory alert prior to rendering the trader position reportable.

At 420, an actual parameter value associated with the trader position is determined. At 430, a comparison operation is performed in which the actual parameter value associated with the trader position is compared against the threshold level. The comparing operation 430 may occur periodically, continually, on-demand, following a predefined event, randomly, at least once daily, and/or daily after processing of all contracts associated with the trader position.

At 440, a determination is made based on the preceding comparison step 430 as to whether the actual parameter value meets or exceeds the established threshold level. If the actual parameter value neither meets nor exceeds the threshold level, the comparison and determination operations may continue to be performed, at 430 and 440, continuously, for a predetermined number of times, or after a predetermined period of time has elapsed.

At 450, one or more intervening measures to regulate transactions that impact the trader position's actual parameter value are imposed if it is determined (at 440) that the actual parameter value meets or exceeds the threshold value.

The determination of whether to impose one or more intervening measures may include several factors, such as determining if the actual parameter is within a predetermined range of the threshold level, if the actual parameter is equivalent to the threshold level, and if the actual parameter exceeds the threshold level.

An example of an intervening measure includes generating an advisory alert that serves to notify an authorized entity. An authorized entity may include a clearing firm, a regulatory entity, a third party, an owner of the trader position, and any combination thereof.

Other intervening measures may include disabling or limiting certain trade registration access associated with the trader position, disabling or limiting access to a trading system, disabling or limiting access to a clearing system, freezing one or more customer accounts, and the like. If an intervening measure is or will be imposed, a communication may be sent via an Internet accessible interface to one or more authorized entities.

In an embodiment, the trader position may be a large-trader position that includes a plurality of contracts across one or more customer accounts that are managed by one or more clearing firms. Each of the customer accounts and related positions may be associated with a single large-trader account. The threshold levels may thus be established for the large-trader position.

Each of the clearing firms associated with the large-trader position may be authorized to obtain information relating to the large-trader position from one another. An authorization process may include entering into an agreement between the one or more clearing firms and the owner of the large-trader position. If the owner no longer has a trader-position at a particular clearing firm, an automatic notification may be generated and sent to the owner and the one or more clearing firms.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

What is claimed is:

1. A non-transitory computer readable medium comprising computer-readable instructions that, when executed by one or more processors, cause the one or more processors to perform the functions of:

generating an aggregate parameter value based on one or more first parameter values associated with a first customer account of a first independent computer system and one or more second parameter values associated with a second customer account of a second independent computer system;

determining that the aggregate parameter value has met or exceeded a threshold level for an aggregate trader position associated with the first customer account and the second customer account;

generating, in response to the determining, an advisory alert;

transmitting the advisory alert to one or more authorized entity systems; and remotely initiating one or more intervening measures.

2. The non-transitory computer-readable medium of claim 1, wherein the functions further comprise:

anonymizing the advisory alert to obfuscate the first independent computer system and the second independent computer system.

3. The non-transitory computer-readable medium of claim 1, wherein the one or more intervening measures comprise one or more of disabling access to an electronic trading system, disabling access to an electronic clearing system, freezing at least one of the first customer account and the second customer account, and disabling trade registration access.

4. The non-transitory computer-readable medium of claim 1, wherein the functions further comprise:
transmitting the threshold level to an owner of the aggregate trader position;
receiving one of an acceptance or rejection of the threshold level by the owner;
transmitting the acceptance or rejection to the one or more authorized entity systems; and
activating the threshold level if accepted by the owner.

5. The non-transitory computer-readable medium of claim 1, wherein the functions further comprise:
generating an approaching alert if it is determined that the aggregate parameter value is within a predetermined range of the threshold level; and
transmitting the approaching alert to the one or more authorized entity systems.

6. The non-transitory computer-readable medium of claim 1, wherein the one or more authorized entity systems comprise one or more of the first independent computer system, the second independent computer system, a regulatory entity, a third party, one or more clearing houses, and an owner of the aggregate trader position.

7. The non-transitory computer-readable medium of claim 1, wherein each of the first independent computer system and the second independent computer system is configured to establish a threshold level particular to itself, the functions further comprising:
comparing the aggregate parameter value with each of the particular threshold levels; and
generating the advisory alert when at least one of the particular threshold levels has been met or exceeded.

8. The non-transitory computer-readable medium of claim 7, wherein each particular threshold level comprises one or more of a percentage of a predetermined value and a percentage of outstanding obligations.

9. The non-transitory computer-readable medium of claim 1, wherein the functions further comprise:
comparing the aggregate parameter value with the threshold level one or more of periodically, continually, on-demand, following a predefined event, randomly, and at least once daily.

10. The non-transitory computer-readable medium of claim 1, wherein the functions further comprises:
notifying one or more of an owner of the aggregate trader position and at least one of the first independent computer system and the second independent computer system if the owner no longer has a trader position at a particular one of the first independent computer system and the second independent computer system; and
excluding the particular one of the first independent computer system and the second independent computer system from receiving any future advisory communications relating to the aggregate trader position.

11. The non-transitory computer-readable medium of claim 1, wherein the threshold level is valid for at least one processing cycle, the functions further comprising:
establishing a threshold level after each processing cycle.

12. The non-transitory computer-readable medium of claim 1, wherein an owner of the aggregate trader position establishes the threshold level as a range of a predetermined level.

13. The non-transitory computer-readable medium of claim 1, wherein the threshold level is at least one of a percentage of a speculative position limit and a percentage of a hedge position limit.

14. The non-transitory computer-readable medium of claim 1, wherein the aggregate parameter value comprises one or more of a total number of contracts of the aggregate trader position, a net value of the contracts, and a risk value associated with the contracts.

15. The non-transitory computer-readable medium of claim 1, wherein the threshold level is established at a value that at least one of renders the aggregate trader position reportable if exceeded and triggers the advisory alert prior to rendering the aggregate trader position reportable.

16. The non-transitory computer-readable medium of claim 1, wherein the aggregate trader position comprises a combination of long and short contracts associated with a particular commodity.

17. The non-transitory computer-readable medium of claim 1, wherein the functions further comprises:
establishing, modifying, or cancelling the threshold level remotely via an Internet accessible interface.

18. The non-transitory computer-readable medium of claim 1, wherein the functions further comprises:
establishing two or more threshold levels associated with the aggregate trader position;
comparing the aggregate parameter value with each of the two or more threshold levels; and
determining, after each compare step, whether to impose one or more intervening measures to regulate transactions that impact an actual value associated with each of the first customer account and the second customer account,
wherein the one or more intervening measures are imposed if it is determined that the aggregate parameter value has met, exceeded, or is within a predetermined range of at least one of the threshold levels.

19. The non-transitory computer-readable medium of claim 1, wherein the advisory alert comprises predetermined account details relating to the first customer account and the second customer account.

20. The non-transitory computer-readable medium of claim 1, wherein the advisory alert is anonymous insofar as it does not reveal an identity of the first independent computer system and the second independent computer system.

21. A system comprising:
at least one server comprising at least one processor and at least one memory, the at least one server in communication with a plurality of independent computer systems and one or more authorized entity systems, the at least one server configured to:
generate an aggregate parameter based on a plurality of parameter values associated with a plurality of customer accounts from among the plurality of independent computer systems, the aggregate parameter representing an aggregate account comprising the plurality of customer accounts;
compare the aggregate parameter to at least one threshold level, the at least one threshold level comprising an aggregate trader position associated with the aggregate account;

generate an alert message when the aggregate parameter value is within a predetermined range of the at least one threshold level; and transmit the alert message to the one or more authorized entity systems, to remotely initiate one or more intervening measures.

22. The system of claim 21, wherein:

the alert message includes an alert comprising one of an approaching alert and an advisory alert, the system is configured to generate the approaching alert when the aggregate parameter value is greater than a first value within the predetermined range, and generate the advisory alert when the aggregate parameter value is greater than a second value within the predetermined range, the second value closer to the at least one threshold level than the first value.

23. The system of claim 22, wherein the at least one server is configured to anonymize the alert included in the alert message to obfuscate the plurality of independent computer systems.

24. The system of claim 21, wherein the one or more intervening measures comprise one or more of disabling access to an electronic trading system, disabling access to an electronic clearing system, freezing at least one of the plurality of customer accounts, and disabling trade registration access.

25. The system of claim 21, wherein the at least one server is further configured to:

transmit the at least one threshold level to an owner of the aggregate trader position;

receive one of an acceptance or rejection of the at least one threshold level by the owner;

transmit the acceptance or rejection to the one or more authorized entity systems; and activate the at least one threshold level if accepted by the owner.

26. The system of claim 21, wherein the one or more authorized entity systems comprise one or more of a regulatory entity, a third party, one or more clearing houses, one or more among the plurality of independent computer systems, and an owner of the aggregate trader position.

27. The system of claim 21, wherein at least one of:

each of the plurality of independent computer systems is configured to establish a threshold level particular to itself, and an owner of the aggregate trader position establishes at least one among the at least one threshold level as a range of a predetermined level.

28. The system of claim 21, wherein the at least one server is further configured to compare the aggregate parameter value to the at least one threshold level one or more of periodically, continually, on-demand, following a predefined event, randomly, and at least once daily.

29. The system of claim 21, wherein the at least one server is further configured to:

notify one or more of an owner of the aggregate trader position and at least one of the plurality of independent computer systems if the owner no longer has a trader position at a particular one of the plurality of independent computer systems; and exclude the particular one of the plurality of independent computer systems from receiving any future advisory communications relating to the aggregate trader position.

30. The system of claim 21, wherein the one or more intervening measures are configured to regulate transactions that impact an actual value associated with the aggregate account.

* * * * *

UNITED STATES PATENT AND TRADEMARK OFFICE
CERTIFICATE OF CORRECTION

| | | |
|---|---|---|
| PATENT NO. | : 11,423,485 B2 | Page 1 of 1 |
| APPLICATION NO. | : 17/667155 | |
| DATED | : August 23, 2022 | |
| INVENTOR(S) | : Hammond et al. | |

It is certified that error appears in the above-identified patent and that said Letters Patent is hereby corrected as shown below:

In the Claims

At Column 10, Lines 58, 61, and 64, after "parameter" please insert --value--.

Signed and Sealed this
Sixth Day of December, 2022

*Katherine Kelly Vidal*

Katherine Kelly Vidal
*Director of the United States Patent and Trademark Office*